C. K. SALISBURY.
COW MILKING MACHINE.
APPLICATION FILED DEC. 13, 1915.
1,198,774.
Patented Sept. 19, 1916.
2 SHEETS—SHEET 2.
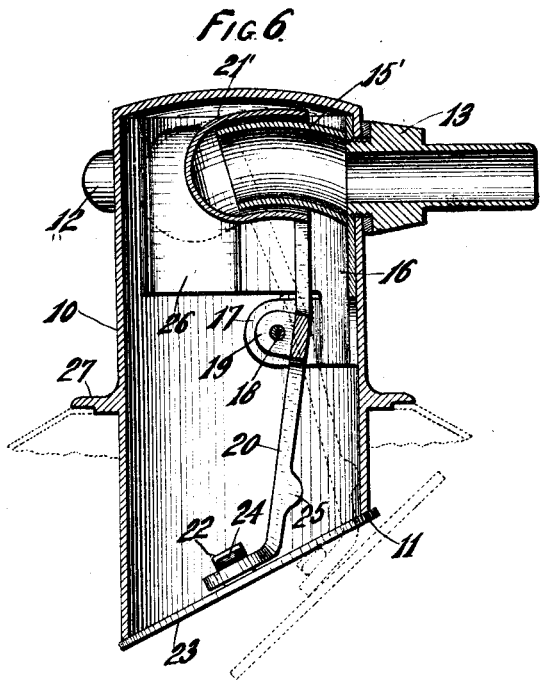
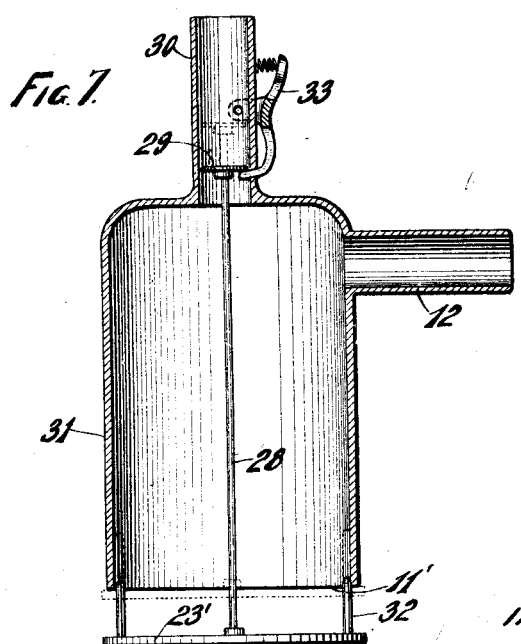

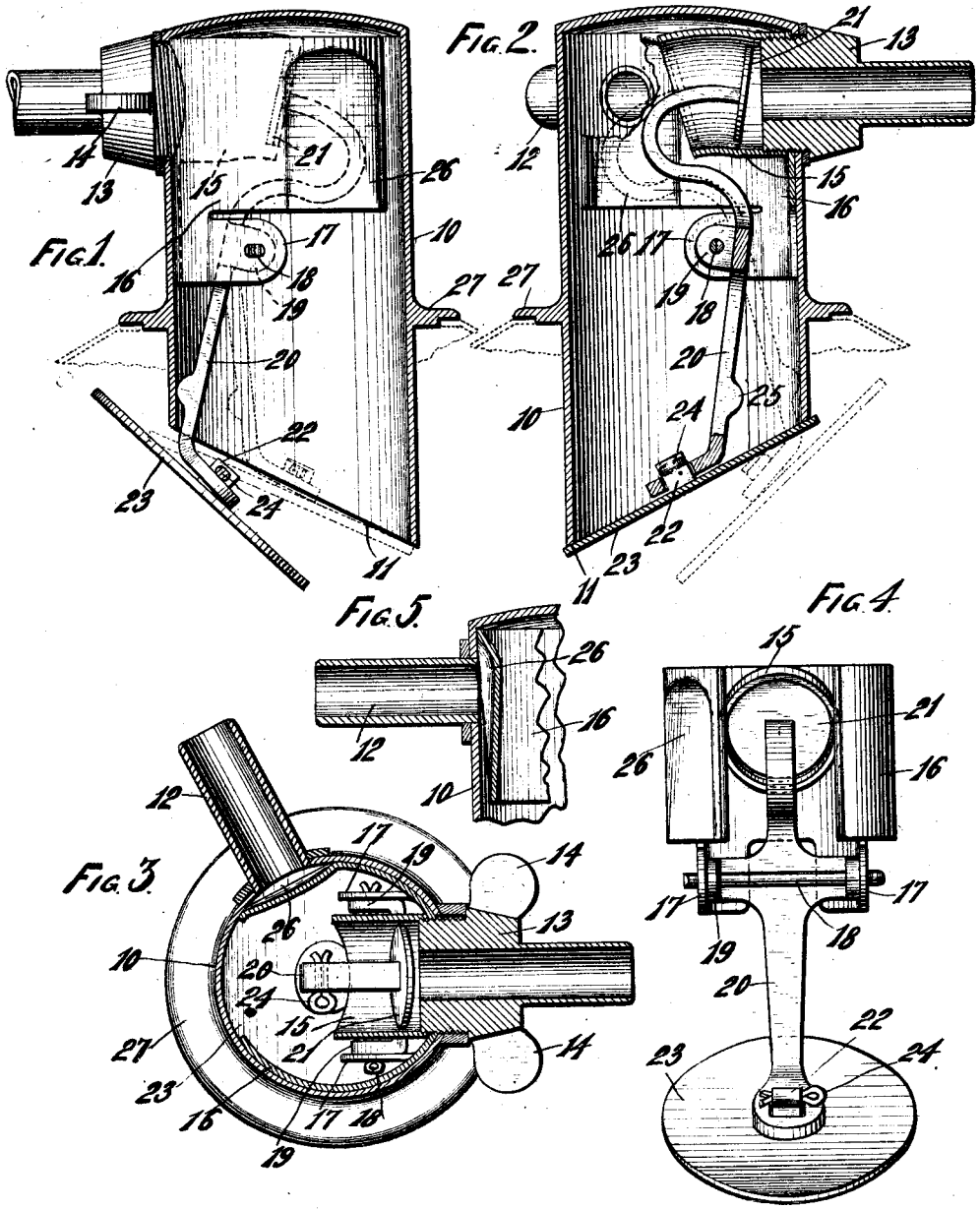

UNITED STATES PATENT OFFICE.

CHARLES K. SALISBURY, OF MILWAUKEE, WISCONSIN, ASSIGNOR OF ONE-HALF TO CHARLES E. SOMERS, OF MILWAUKEE, WISCONSIN.

COW-MILKING MACHINE.

1,198,774. Specification of Letters Patent. Patented Sept. 19, 1916.

Application filed December 13, 1915. Serial No. 66,407.

*To all whom it may concern:*

Be it known that I, CHARLES K. SALISBURY, a citizen of the United States, and resident of Milwaukee, in the county of Milwaukee and State of Wisconsin, have invented new and useful Improvements in Cow-Milking Machines, of which the following is a description, reference being had to the accompanying drawings, which are a part of this specification.

This invention relates to cow milking machines of the type in which a milk chamber connected with a suction pump and with the teat cups is provided with an open, lower end which is automatically closed by a valve upon the beginning of the suction stroke of the pump, said valve being pivotally suspended within the milk chamber in such a manner as to normally hang in a fully open position requiring only a short movement to reach its closed position.

Another object of the invention is to provide such a pivotally suspended valve with a plunger working loosely in the air pump connection somewhat in the manner of the construction shown in Patent No. 907,236 to Hinman, dated December 22, 1908. However, on account of the weight of the valve being supported by its pivotal connection, and therefore requiring less force to move it from one position to the other, the plunger of this invention is given such a loose fit in the pump connection that it maintains the same clearance from the walls of the pump connection in all positions thereof so that communication between the pump and the milk chamber is maintained at all times, the only obstruction in such communication being the plunger, and said obstruction remaining constant for all positions of the valve.

Another object of the invention is to provide such a valved milk chamber with a delicately balanced metal valve capable of quickly adjusting itself to the inclined valve seat to effect a tight closure instantly upon the beginning of the suction stroke of the pump.

Another object of the invention is to provide such a valved milk chamber with few parts of simple construction and easily disconnected for cleaning.

With the above and other objects in view the invention consists in the cow milking machine as herein claimed and all equivalents.

Referring to the accompanying drawings, in which like characters of reference indicate the same parts in the different views, Figure 1 is a vertical sectional view of the cow milking machine of this invention showing the valve in full lines in its open position and in dotted lines in its normal partly closed position; Fig. 2 is a similar view thereof also sectioning the pump connection and showing the valve in full lines in its closed position and in dotted lines in its open position; Fig. 3 is a sectional plan view thereof; Fig. 4 is a detail view of the valve and its supporting means; Fig. 5 is a sectional view of the milk connection showing the guard for spreading the milk along the walls of the milk chamber; Fig. 6 is a sectional view of a modified form of the invention in which the valve is actuated by a cap fitting over the pump connection instead of by means of a plunger within the pump connection; and, Fig. 7 is a sectional view of a further modification in which the valve is not pivotally suspended, but is supported directly by the plunger in the pump connection.

In these drawings 10 indicates a cylindrical casing constituting a milk chamber which is open at its lower end forming an inclined valve seat 11 and is otherwise closed except for a milk connection nipple 12 near its upper end and an opening to receive a screw plug pump connection nipple 13.

The milk connection nipple 12 is adapted to be connected by a flexible hose with teat cups, and the pump connection 13 is adapted to be similarly connected with a suitably operated valveless reciprocating pump of any desirable construction, as for example, the construction shown in the Hinman Reissue Patent No. 13,876, dated February 9, 1915. The pump connection nipple 13 may be provided with wings 14 for readily turning it into or out of position, and passing freely through the opening referred to threads into a curved tubular pump connection extension 15 which is fixed on a split cylindrical lining 16 fitting within the upper end of the milk chamber. Ears 17 are cut from the lower edge of the lining 16 and are bent parallel to each other to form bearings through which a cotter pin 18 passes.

Pivotally mounted on the cotter pin between the bearing ears 17 are parallel ears 19 of a valve lever 20 whose upper end is bent to enter the pump connection extension 15 without contacting therewith. A plunger 21 is carried on the bent upper end of the valve lever 20 and freely travels within the pump connection extension with a clearance between its edges and the walls thereof which remains constant throughout the travel of the plunger by reason of the pump connection extension being curved on the pivotal axis of the valve lever as a center.

The lower end of the valve lever 20 is bent at an angle and has a rectangular opening therethrough forming a socket to loosely receive a somewhat smaller square lug or projection 22 on the upper surface of a disk-shaped metal valve, 23, a cotter pin 24 passing through the end of the projection 22 to loosely suspend the valve from the end of the valve lever. The valve 23 fits against the inclined valve seat 11 and the lug 22 is positioned slightly nearer the lower edge of the valve so that when the valve is free from the valve seat it has a tendency to swing on its connection with the valve lever with its upper edge farther from the pivot pin 18 than when in its closed position. The lower edge of the valve is the first to contact with the valve seat on swinging toward its closed position so that the valve takes a sliding pivotal movement on such contacting lower edge as a fulcrum with the result that it snaps shut against its seat with an accelerated final movement which is facilitated by the direct action of the suction upon the valve. This quick final closing motion of the valve is further facilitated by the pivotal connection 18 of the valve lever being positioned back of the center of the valve whereby the travel of the end of the valve lever is slightly upwardly, thus tending to lift the valve as well as moving it horizontally toward the inclined valve seat. This quick closing action of the valve at the very beginning of the suction stroke of the pump is important as it enables a greater portion of the suction stroke of the pump to be communicated to the teat cups and permits of the establishment of such communication during the comparatively slow portion of the movement of the pump piston in its suction stroke, thus enabling the suction communicated to the teat cups upon the closing of the valve to begin moderately and gradually increase in force as the speed of the pump piston increases, thus avoiding a sudden application of suction that would result from a delayed closing of the valve until the piston of the suction pump had acquired its maximum speed.

At the end of the suction stroke of the pump the valve swings open under the weight of the milk bearing upon it and under the action of the return of air under pressure from the pump, such pressure acting upon the plunger 21 and upon the valve direct to accomplish this purpose. To prevent the valve lever striking against the valve seat it is desirably provided with a stop lug 25 to engage the inner wall of the milk chamber. At the end of the return stroke of the piston the valve is quickly returned to its closed position by the suction from the pump drawing the plunger 21 into the pump connection extension 15, and this movement is completed with the snap action before referred to to most effectively seal the milk chamber and cause the suction to be communicated through the milk chamber to the teat cups. The cylindrical lining 16 besides serving as a guide for positioning the removable parts in the interior of the milk chamber further serves as a milk spreader for deflecting the flow of milk entering the milk chamber from the milk connection 12 so that said flow of milk is spread along the walls of the milk chamber and is thus prevented from entering the pump connection. This is accomplished by forming a depression or indentation 26 in the lining 16 where it covers the end of the milk connection 12, such depression opening downwardly and being contracted at its lower edge to cause the milk to flow down the walls of the milk chamber in a thin stream.

The milk chamber 10 may be supported in any suitable manner within or above a receptacle such as an ordinary milking bucket, but it is preferably provided with a flange 27 which may be permanently or removably connected with the milk pail cover, of which parts are shown in dotted lines.

By unscrewing the pump connection nipple 13 the valve supporting member 16 is released and the valve and all interior parts are removable from the milk chamber, permitting of thorough cleaning thereof.

The plunger 21 with its loose fit in the arc-shaped pump connection extension 15 serves as a motor operated by the movements of the pump piston for opening and closing the valve, the plunger occupying sufficient sectional area of the tube 15 to be sensitive to the currents of air therethrough in either direction so as to readily respond to their influence and move with them to open and close the valve, but the clearance between the plunger and the walls of the tube being sufficient to allow a slippage of air past the plunger in all positions of the plunger so that operative communication between the pump and the milk chamber is maintained at all times. Though the passageway between the pump and the milk chamber is restricted by the presence of the plunger to an extent that is necessary to impart movement to the plunger for operating the valve the extent of such restriction is invariable, owing to the tube being arc-shaped and concentric with the pivotal mounting of the plunger support.

In operation the reciprocations of the pump piston produce oscillations of the valve lever by the action of the reversing currents of air on the plunger 21 and as soon as the valve is closed the suction communicated to the milk chamber from the pump is transmitted to the teat cups to draw milk from the cow's udder into the milk chamber through the milk connection 12. During the return stroke of the pump piston the return of air through the pump connection causes the valve to open and permit the milk to run from the milk chamber, and these operations are repeated.

It is obvious that the plunger may fit on the outside of the pump connection in the form of a cup-shaped cap instead of on the inside thereof, and in Fig. 6 this modification is shown, the plunger consisting of a curved cup-shaped cap 21' covering the end of the pump connection extension 15', both being curved concentrically with the pivotal axis of the valve lever 20 so as to maintain invariable the clearance space between them.

A further modification is shown in Fig. 7, wherein the pivotal support for the valve is dispensed with and a valve 23' is carried on a central vertical rod 28 which is operated by a plunger 29 loose within the unvarying bore of a pump connection 30 coaxial with the milk chamber 31. In this construction, as in the others, the plunger has a fixed clearance in its relation to the walls of the pump connection that does not vary in any position thereof and which is sufficient to maintain operative communication between the milk chamber and the pump at all times, though the plunger offers sufficient obstruction to the passage of air through the pump connection to operate as a motor for opening and closing the valve. In this construction it may be advisable to provide the valve with upstanding guide posts 32 to engage the inner walls of the milk chamber 31 to keep the valve centrally positioned, the valve seat 11' being arranged to correspond with the position of the valve. In this construction also it may be advisable to provide a pivoted spring pressed dog 33 on the pump connection 30 with its curved end passing through an opening in the pump connection to project beneath the plunger 29 and form a removable stop in the path thereof to limit its downward movement and thus retain the valve and plunger in their operative positions until it is desired to remove them for cleaning, when the stop may be removed by pressing the dog against the action of its spring.

The operation of these modified forms of the invention will be apparent from the description of the operation of the preferred form.

What I claim as new and desire to secure by Letters Patent is:

1. In a milking machine, a milk chamber having an open bottom and a pump connection and a teat cup connection, a suitably supported valve for closing the opening of the milk chamber, and a plunger connected with the valve and having an operative relation to the pump connection to receive movement from the current of air flowing therethrough for causing the opening and closing of the valve, the clearance between the plunger and the pump connection being constant in all positions of the plunger.

2. In a milking machine, a milk chamber having an open bottom and a pump connection and a teat cup connection, a valve for closing the opening of the milk chamber, and a plunger connected with the valve and fitting within the pump connection and having a fixed clearance from the walls thereof through which communication between the milk chamber and the pump is maintained at all times, said plunger restricting the flow of air through the pump connection to a sufficient extent to be moved thereby for changing the positions of the valve.

3. In a milking machine, a milk chamber having an open bottom and a pump connection and a teat cup connection, a valve for closing the bottom opening of the milk chamber, a lever fulcrumed within the milk chamber and connected with the valve, and a plunger connected with the lever and positioned within the pump connection.

4. In a milking machine, a milk chamber having an open bottom, a teat cup connection and a pump connection, a valve for closing the bottom opening of the milk chamber, a suitably fulcrumed lever connected with the valve, and a plunger carried by the lever and located within the pump connection, said pump connection being curved about the fulcrum of the lever as a center so that the travel of the plunger therein does not materially vary the clearance between them.

5. In a milking machine, a milk chamber having an open bottom and a teat cup connection and a pump connection, a valve for closing the bottom opening of the milk chamber, a lever fulcrumed within the milk chamber and having the valve loosely suspended therefrom, and a plunger carried by the lever and located inside of the pump connection, said pump connection being curved about the fulcrum of the lever as a center.

6. In a milking machine, a milk chamber having an open bottom and a teat cup connection, a valve for closing the bottom opening of the milk chamber, a supporting member within the milk chamber, a pump connection nipple passing through the wall of the milk chamber and engaging the supporting member to hold it in place, a pump connection tubular extension on the supporting member, a valve lever fulcrumed on the supporting member and supporting the valve, and a plunger on the valve lever coöperating with the pump connection extension to receive motion from the currents of air passing therethrough for opening and closing the valve.

7. In a milking machine, a milk chamber having an open bottom and a teat cup connection, a valve for closing the bottom opening of the milk chamber, a lining removably fitting within the milk chamber, a pump connection nipple passing through the wall of the milk chamber and engaging the lining to hold it in place, a tubular pump connection extension on the lining communicating with the pump connection nipple, a lever fulcrumed on the lining and supporting the valve, and a plunger on the lever fitting within the pump connection extension, the lining having a depression spaced from the walls of the milk chamber around the teat cup connection for spreading the flow of milk along the walls of the milk chamber.

8. In a milking machine, a milk chamber having an open bottom, a teat cup connection and a pump connection, a suitably operated lever fulcrumed within the milk chamber, and a valve loosely mounted on the lever for closing the bottom opening of the milk chamber.

9. In a milking machine, a milk chamber having an open bottom and a teat cup connection and a pump connection, a valve for closing the bottom opening of the milk chamber, a valve supporting means, and a loose connection between the valve supporting means and the valve offset from the center of the valve and permitting a tilting movement of the valve.

10. In a milking machine, a milk chamber having an open bottom forming an inclined valve seat and having a teat cup connection and a pump connection, an inclined valve to fit on the valve seat, a lever within the milk chamber, and a loose connection between the lever and the valve offset from the center of the valve.

11. In a milking machine, a milk chamber having an open bottom forming an inclined valve seat and having a teat cup connection and a pump connection, a valve for closing the valve seat, a lever fulcrumed within the milk chamber and having an angular opening in its end, an angular lug on the valve offset from the center of the valve toward the lower edge of the valve and loosely fitting in the angular opening of the lever, and means for holding the lug within the opening of the lever.

12. In a milking machine, a milk chamber having an open bottom and a pump connection and a teat cup connection, a suitably supported valve for closing the bottom opening of the milk chamber, and a plunger connected with the valve and having an operative relation to the pump connection to receive movement from the current of air flowing therethrough for causing the opening and closing of the valve, there being a slippage of air past the plunger through a space constant in area in all positions of the plunger.

In testimony whereof, I affix my signature, in presence of two witnesses.

CHARLES K. SALISBURY.

Witnesses:
  KATHERINE HOLT,
  R. S. C. CALDWELL.